Nov. 25, 1947.  F. P. WILLCOX  2,431,356
FILM HOLDER
Original Filed Oct. 16, 1943
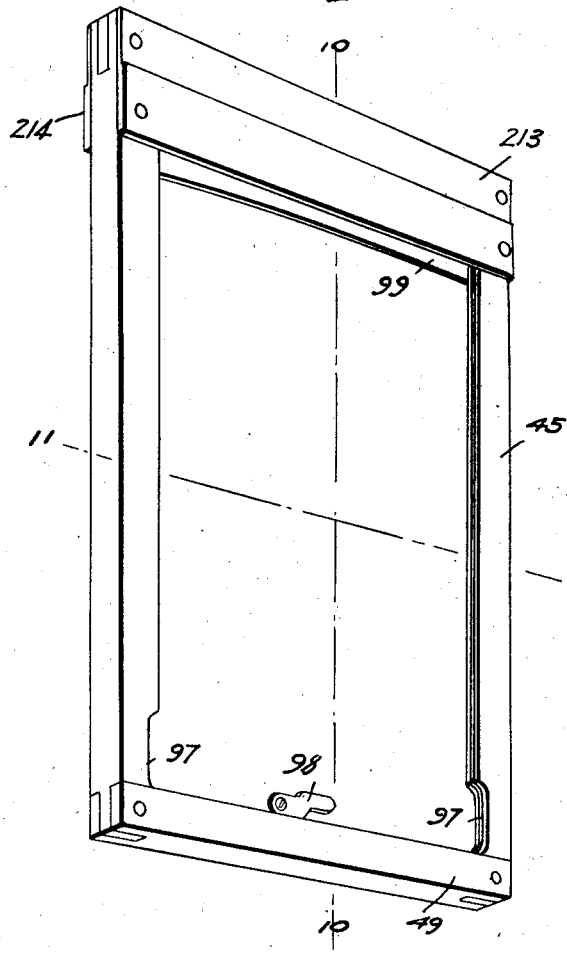
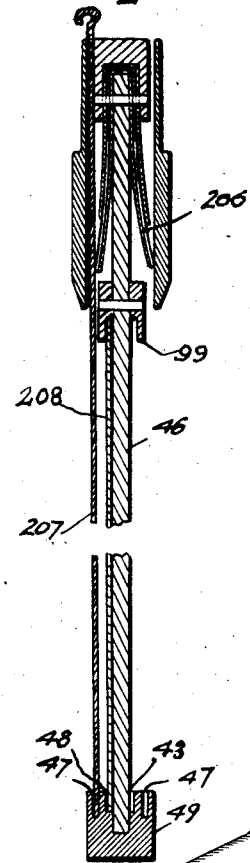
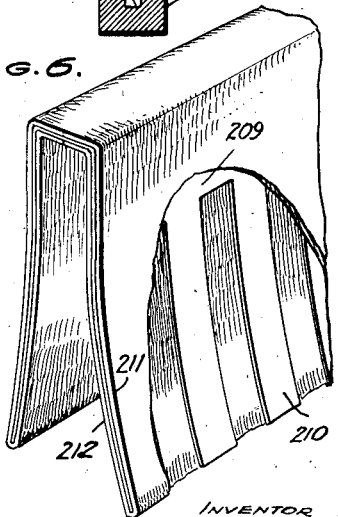
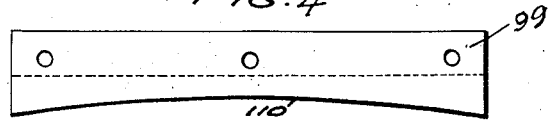
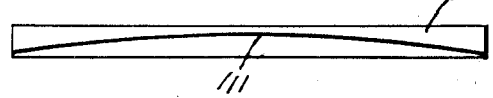
INVENTOR
FREDERICK P. WILLCOX
By William D. Hall,
ATTORNEY Patented Nov. 25, 1947

2,431,356

UNITED STATES PATENT OFFICE 2,431,356

FILM HOLDER

Frederick P. Willcox, United States Army, Arlington County, Va.

Original application October 16, 1943, Serial No. 506,521. Divided and this application February 27, 1945, Serial No. 580,056

2 Claims. (Cl. 95—68)

(Granted under the act of March 3, 1883, as amended April 30, 1928; 370 O. G. 757)

The invention described herein may be manufactured and used by or for the Government for governmental purposes, without the payment of any royalty thereon.

This application is a division of my application Serial No. 506,521, filed October 16, 1943, now Patent Number 2,413,017, issued December 24, 1946.

This invention relates to cameras, and more particularly to improvements in film holders for use in cameras.

It is an object of this invention to provide a double sheet film holder, made of metal, and of such structure as to have 60% less bulk than those commonly used, and so designed as to lend itself to precision manufacture. The structure is so designed as to have great inherent strength so as to be practically unbreakable, due to the stressing of the central partition plate, which is assembled, or cast integrally with the side end bars, the plate taking such stressing to prevent deformation of the film holder such as might be caused by dropping or other rough treatment by the user.

A further object is the provision of a double sheet film holder of rigid and simple construction which avoids the delicate structures of those in current use such as hinged end pieces which, in the common construction, must be swung out for the insertion of film, said pieces having fragile cloth hinges and a longitudinal slot which weakens them tremendously. The lack of rigidity in prior constructions, that lack of rigidity being largely the result of a hinged bottom member to the frame, is objectionable.

A further object is the provision in a double sheet film holder, of a novel, rigid and simple construction which embodies in its design the use of dark slides of a metal, such as stainless steel, such metallic slides being more durable than the hard rubber slides heretofore used. Hard rubber slides are further objectionable in that when they are slid in and out of the holder they acquire an electrostatic charge from rubbing over the cloth material which forms part of the light trap. This electrostatic charge attracts dust to the slide, and some of this dust falls on the surface of the film when the electrostatic charge is dissipated, thus giving rise to objectionable dust spots appearing on the film when it is developed.

A further object is to provide, in a double sheet film holder, a means for holding one end of the film (the end first inserted), in a flat position after insertion, such means being designed so that the use of the thumb or finger nail to guide the first inserted end of the film under the hold-down piece, as is necessary in prior construction, is obviated. The design of this hold-down piece incorporates two curves in the leading edge; one in a plane parallel to the surface of the film, and the other in a plane perpendicular to the surface of the film, which curves, together, guide the end of the film under the hold-down piece without assistance from the fingers of the user.

Figure 1 is a perspective view of a film holder embodying the invention.

Figure 2 is a sectional view taken on the line 10—10 of Figure 1.

Figure 3 is a sectional view taken on the line 11—11 of Figure 1.

Figure 4 is a plan view of a portion of the film holder.

Figure 5 is a front elevational view of the portion shown in Figure 4.

Figure 6 is a perspective view of the light trap.

Referring to the drawings, in Figures 1 and 2 there is shown a film holder provided with a light trap 206, hereinafter described, and having the form of a rectangular channeled frame 45, which has a central partition plate 46 for separating the photographic films. The partition is either assembled or cast integrally with the frame 45. The channelled frame 45 has grooves 47 for dark slides 207, grooves 48 for films 208, and a deeper groove for the partition plate 46. Channelled frame end 49 is affixed by rivets or other suitable means to the side pieces of frame 45, and has grooves for dark slides and for the central partition plate 46.

The holder, shown to exaggerated thickness in the drawings, is made, preferably, entirely of metal which enables it to be 60% smaller in bulk than holders made of wood and other materials. Also, the metal structure enables the location of the surface of the film to be kept within tolerances of plus or minus one one-thousandth of an inch, permitting more accurate photography. The dark slides 207 are made of metal instead of hard rubber, and therefore, are free from dust due to static electric charges such as are built up in conventional holders when hard rubber dark slides are inserted or withdrawn. The borders of frame 45 are cut-away at 97 to facilitate the insertion of a film, and a small pivoted arm 98 is provided to hold the film in place at one end. The other end of the film is held down by a bar 99 having a curved portion 110 (see Figure 4) in a plane parallel to the plane of the partition, and a curved portion 111 (see Figure 5) in a plane perpendicular to the plane of the partition, which curved portion guides and facilitates the insertion of film.

The novel light trap 206 is shown in Fig. 6 to comprise a metal base 209, of resilient metal, having a plurality of fingers 210. A sheet of felt or similar material is wrapped about the base providing an outer layer 211 and an inner layer 212.

The light trap is positioned between 213, 214 of the head piece of the film holder (see Fig. 2) and held in place in a groove of a block 215, which has a tight fit between the upper portion of walls 213, 214. The block 215 is further held in place by a tongue and groove connection with the side members of the rectangular frame 45. The light trap is thus clamped between the block 215 and the partition plate 46. The free edges of the trap firmly abut the inner sides of walls 213, 214 and provide an absolute shield against entry of light.

I claim:

1. A film holder comprising a thin plate of rectangular outline, frame elements embracing said plate adjacent three of its edges, said frame elements being internally grooved to receive a film, the two elements at opposite edges of said plate being internally cut away adjacent the third element to provide channels communicating with said groove for the insertion of a film, and a film retaining bar extending between said two elements and parallel to the third element and supporting said plate at the edge thereof opposite that which is embraced by the said third element, a groove in said bar forming a continuation of the grooves in said other elements, the inner edge of said bar being curved in a plane parallel to said plate to arch inwardly from the ends toward the center of said grooved bar, and the groove defining undersurface of said bar being curved in a plane perpendicular to said plate to arch upwardly away from the plate at the center of the bar.

2. A film holder comprising a thin plate of rectangular outline, frame elements embracing said plate adjacent the sides and bottom thereof and a film retaining bar extending between said elements which embrace the plate at its sides and supporting the top edge of the plate, grooves at the inner edges of the side frame members and a continuing groove in the bar within which a film may be inserted, means adjacent the bottom frame member within which the film is initially inserted for entry into the side member grooves, the inner edge of said bar being curved in a plane parallel to said plate to arch inwardly from the ends toward the center of said grooved bar, and the groove defining undersurface of said bar being curved in a plane perpendicular to said plate to arch upwardly away from the plate at the center of the bar.

FREDERICK P. WILLCOX.

REFERENCES CITED

The following references are of record in the file of this patent:

UNITED STATES PATENTS

| Number | Name | Date |
|---|---|---|
| 370,370 | Blair | Sept. 27, 1887 |
| 437,656 | Lewis | Sept. 30, 1890 |
| 708,370 | Lewis | Sept. 2, 1902 |
| 894,582 | Borsum | July 28, 1908 |
| 925,895 | Goddard | June 22, 1909 |
| 1,631,479 | Folmer | June 7, 1927 |
| 2,344,951 | Smith | Mar. 28, 1944 |

FOREIGN PATENTS

| Number | Country | Date |
|---|---|---|
| 483 | Great Britain | Jan. 7, 1911 |
| 2,244 | France | Dec. 2, 1903 |

1st Addition to Patent No. 296,253